US009567025B2

(12) United States Patent
Strother et al.

(10) Patent No.: US 9,567,025 B2
(45) Date of Patent: Feb. 14, 2017

(54) SYSTEM AND METHOD FOR BICYCLE SHARING AND RENTAL

(71) Applicants: Ansgar Varick Strother, Ann Arbor, MI (US); Keith Ballew Porter, Grosse Pointe, MI (US)

(72) Inventors: Ansgar Varick Strother, Ann Arbor, MI (US); Keith Ballew Porter, Grosse Pointe, MI (US)

(73) Assignee: Porter & Strother, LLC, Ann Arbor, MI (US)

( * ) Notice: Subject to any disclaimer, the term of this patent is extended or adjusted under 35 U.S.C. 154(b) by 32 days.

(21) Appl. No.: 14/187,250

(22) Filed: Feb. 22, 2014

(65) Prior Publication Data

US 2014/0265237 A1    Sep. 18, 2014

Related U.S. Application Data

(60) Provisional application No. 61/787,846, filed on Mar. 15, 2013.

(51) Int. Cl.
*B62H 5/00*    (2006.01)
*B62H 3/00*    (2006.01)

(52) U.S. Cl.
CPC .... *B62H 5/00* (2013.01); *B62H 3/00* (2013.01); *B62H 2003/005* (2013.01)

(58) Field of Classification Search
CPC ..... G07F 17/10; B62H 3/00; B62H 2003/005; B62H 5/00; Y10T 70/5881; Y10T 70/5836
USPC ................................... 211/1.51, 4, 5, 17, 22
See application file for complete search history.

(56) References Cited

U.S. PATENT DOCUMENTS

| 3,887,075 | A  | * | 6/1975  | Harvey ............................ 211/5 |
|-----------|----|---|---------|------------------------------------------|
| 4,433,787 | A  | * | 2/1984  | Cook et al. ...................... 211/5 |
| 4,830,167 | A  | * | 5/1989  | Lassche ........................ 194/247 |
| 4,920,334 | A  | * | 4/1990  | DeVolpi ...................... 340/568.4 |
| 5,917,407 | A  | * | 6/1999  | Squire et al. ................. 340/432 |
| 6,751,992 | B1 |   | 6/2004  | Esquilin |
| 7,726,160 | B2 | * | 6/2010  | Gagosz et al. .................. 70/233 |
| 2004/0124159 | A1 | * | 7/2004 | West .............................. 211/19 |
| 2009/0266673 | A1 | * | 10/2009 | Dallaire .................. B62H 3/02 194/205 |
| 2010/0228405 | A1 |   | 9/2010 | Morgal et al. |
| 2011/0226708 | A1 |   | 9/2011 | Mercat et al. |
| 2011/0307394 | A1 |   | 12/2011 | Rzepecki |
| 2013/0193091 | A1 |   | 8/2013 | Kritzer et al. |

FOREIGN PATENT DOCUMENTS

EP    2261108 A2    12/2010

* cited by examiner

*Primary Examiner* — Korie H Chan
(74) *Attorney, Agent, or Firm* — Jelic Patent Services, LLC; Stanley E. Jelic

(57) ABSTRACT

A system and method for bicycle sharing and rental with a rack and one or more bicycles. The rack has a base with one or more locking arm(s), wherein each locking arm has a first end secured to the base and a second end, further wherein the second end has a fixture attached. The rack does not have any closed loops, preventing unauthorized bicycles from being secured to it. The bicycles have a controllable portion of a locking mechanism and a control device, wherein the control device is configured to enable the fixture to be secured to the controllable portion of the locking mechanism and further secure the bicycle device(s) to the rack.

13 Claims, 12 Drawing Sheets

SYSTEM AND METHOD FOR BICYCLE SHARING AND RENTAL

CROSS-REFERENCE TO RELATED APPLICATIONS

This application claims the priority benefit of U.S. Provisional Application 61/787,846 filed Mar. 15, 2013, which is herein incorporated by reference in its entirety.

TECHNICAL FIELD

The present disclosure relates to the field of bicycle sharing and rental. More particularly, the disclosure discusses systems and methods to secure and track the bicycles.

BACKGROUND

With the problems of rising energy costs and urban congestion, municipalities and communities are increasingly looking towards bicycles as an economical and environmentally friendly method of transportation. Despite the advantages of bicycle transportation, bicycles can be cost prohibitive for many individuals. Moreover, many individuals use bicycles infrequently, and thus will not invest in a bicycle. In addition, bicycle ownership may not be practical for certain users. One example of a drawback to bicycle ownership appears in the context of public transportation. Many commuters travel long distances for work using public transportation, but lack the means to travel from the public transportation station to their home or work. This is referred to as the "last-mile" problem, and often causes commuters to rely on personal automobiles rather than public transportation. Bicycle ownership is not a viable solution to this problem because it is difficult to transport a bicycle on public transportation.

BRIEF SUMMARY OF THE INVENTION

A system for bicycle sharing and rental comprises: a rack which comprises a base with one or more locking arm(s), wherein each locking arm has a first end secured to the base and a second end, further wherein the second end has a fixture attached; and one or more bicycle device(s) which comprises a bicycle, a controllable portion of a locking mechanism and a control device, wherein the control device is configured to enable the fixture to be secured to the controllable portion of the locking mechanism and further secure the bicycle device(s) to the rack.

The base can have a plurality of ports which are configured to hold a bicycle wheel and by extension secure an entire bicycle. The plurality of ports can exist side-by-side, enabling the bicycles to be secured next to each other.

The arms can be in S-shape, L-shape, straight rod, or any shape conducive to securing a bicycle wheel. The arms are configured to secure a properly equipped bicycle via the locking mechanism. The arms can be parallel to each other. The arms are connected to the base at the bottom of the arms. The male portion of the locking mechanism is located at the top of the arm. The arms do not contact each other.

The rack does not have any closed loops of any shape. This prevents unauthorized bicycles from being secured to the rack. For example, a bicycle could not be secured to the rack with a cable or chain that wraps through a loop on a standard bike rack.

The bicycle can be any two wheeled device configured to enable a person to ride it. The bicycle is typically not motorized, but in certain embodiments a motor can be attached for propulsion. In some embodiments, the system can substitute a one-wheeled device (e.g. a unicycle) or a three wheeled device (e.g. a tricycle) for the bicycle.

The locking mechanism can have a male portion and a female portion. The male portion comprises a prong. The female portion comprises a spring, a pin, and a servo.

In a separate embodiment, the fixture can be a prong. The fixture can be manually inserted into the controllable portion of the locking mechanism by the user and the fixture can be secured within the locking mechanism, hence no external power source is needed. However, the fixture can only be released from the controllable portion of the locking mechanism with an external power source such as the control device.

The fixture is keyed to ensure that it matches the locking mechanism. Only matching fixtures and locking mechanisms can work together.

The control device can be a computing environment comprising a touch-screen, computational means, and communication means. The control device can send a signal to the controllable portion of the locking mechanism to either release the bicycle (open the lock) or secure the bicycle (close the lock). The controllable portion of the locking mechanism accepts the signal and opens or closes the lock via a servo. Detailed embodiments of a computing environment are cited further in the detailed description.

A method for bicycle sharing and rental comprises: employing a rack which comprises a base with one or more locking arm(s), wherein each locking arm has a first end secured to the base and a second end, further wherein the second end has a fixture attached; and providing one or more bicycle device(s) which comprises a bicycle, a controllable portion of a locking mechanism, and a control device, wherein the control device is configured to enable the second end to be secured to the controllable portion of the locking mechanism and further secure the bicycle device(s) to the rack.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION OF THE INVENTION

Figure 1:
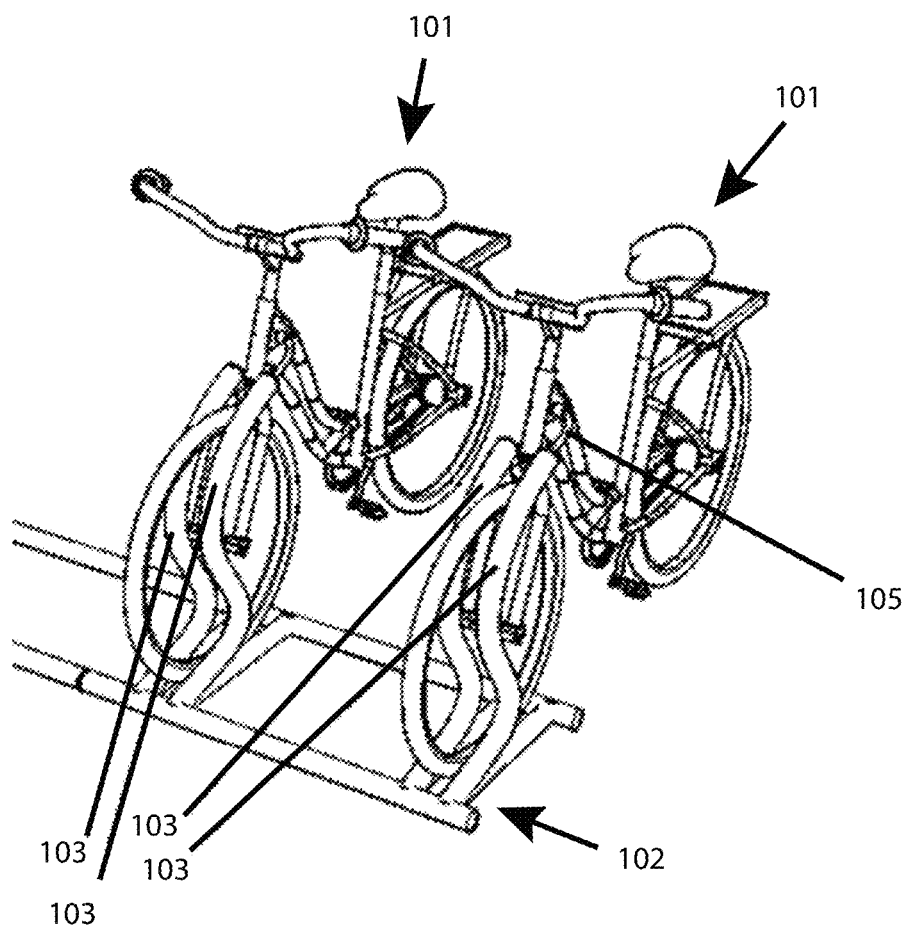
FIG. 1 shows a perspective view of an embodiment of the system with two secured bicycles.

Bicycle sharing has been implemented in many towns and cities to support public transportation. Most of these bicycle sharing programs encounter problems related to vandalism, theft, and the high cost of maintenance. To address these issues, some bicycle sharing programs require the user to leave a deposit or identification to prevent bicycle theft. This system relies on employees to monitor the identities of individuals who rent bicycles at rental locations, and therefore the number of locations that the public can rent bicycles from is limited due to cost. Attempts to deter theft include the use of bicycles with non-removable parts and unique visual appearances, which limit their utility outside of the bicycle sharing program.

Recent bicycle sharing programs have attempted to eliminate the need for active management by employing "smart" terminals that track the status of rented bicycles. These terminals can track variables related to individual rental bicycles, such as whether a bicycle has been rented and when it has been returned. If a bicycle is never returned, the system can automatically charge the renter for the cost of the bicycle. While current automated systems are an appealing method of bicycle sharing, the system has not been widely implemented due to the high cost of the "smart" bicycle terminals.

The inventors conducted additional research and discovered that ~80% cost of bike sharing resides in the kiosk docking stations. Based on this fact, the initial concept of removing the station was developed. Further research showed that this concept is being considered by other inventors. The primary problem with this concept is that these systems do not allow for walk up usage. Hence, users have to already be members to use the bikes and have to either go to a website or text-in for a code to unlock a bike.

This is a major issue as many cities creating bike sharing systems require the system to be accessible to all members of the community. The requirement of a phone to use the system prevents low income members of a community from being able to use the system.

The inventors solve this issue by incorporating an electronic console with an integrated touch screen on the handle bars of the bike. This touch screen could then be used for allowing bike walk up rentals. Additionally, the touch screen could be used to provide a better user experience through system information, maps, tours, and advertisements.

Incorporating the electronic console is difficult since systems cannot require any external power. All power must come from some renewable source that is on bike or at the station. Touchscreens require large amounts of power so creating a system that could run off of a bike solar panel or dynamo was a significant challenge. In addition to challenges with power, the on-bike touch screen system must be durable enough to survive on a bike.

Through additional inventor research, several key issues arose that had prevented station-less systems from becoming popular in the market place. For example, a station-less system is not as secure as there is no guarantee that the on-bike lock module is locked to anything. Furthermore since a station-less bike can lock to any object, there is concern about branding and ease of customer identification. The above three issues are deal-breakers to communities.

The present system and method utilizes a "dumb rack" concept to overcome the problems cited above. The rack is configured to allow only qualified bicycles to become secured to it. This innovation creates a system and method that enables the branding, structure, and security to match stationed systems but came at half of the cost.

The challenge of creating a dumb rack is to create a securing device which is both robust and unobtrusive enough to fit on a bicycle. Due to the torsional forces that a bicycle can apply to a lock module, several iterations of experimentation were required to design a lock module which met the requirements.

On-going successful experimental testing of the system and method is taking place in Lansing, Mich.

With recent developments in mobile technology, it is becoming increasingly economical to employ telematic systems in transportation. A system of bicycle sharing that successfully implements recent developments in mobile technology will offer the benefits associated with a "smart" terminal, but without as prohibitively high costs associated with such terminals. Such a system will make bicycle sharing a much more viable method of public transportation in towns and cities throughout the world.

The bike share system described herein may include a plurality of bicycles and an open-frame bike rack for parking the plurality of bicycles. Each bicycle of the plurality may contain one component half of a locking mechanism, which corresponds to another half component of the locking mechanism located on the open-frame bike rack. Each of the plurality of bicycles may be locked or unlocked to the open-frame rack through signaling governed by an electronic console located on each of the plurality of bicycles. A battery mounted to the bicycles may serve as the power source for the electronic console. The battery may be recharged using solar cells, power generated through the mechanical motion of the bicycle, or power routed through the bicycle rack.

Bike-share bicycle refers to a bicycle for use in the bicycle sharing system. A bicycle may, for example, be defined as any two wheel pedal driven vehicle, or two wheeled vehicle powered completely or partially by an electric or carbon fuel based motor. In addition to the standard components of a bicycle, the bike-share bicycle may also include an electronic console, a battery for powering the electronic console, one or more means of charging the battery, and a locking mechanism that allows the bike-share bicycle to be locked onto the open-frame bicycle rack. In one embodiment, the bicycles used in the bike-share system should be reliable, sturdy and easily identifiable by a particular color scheme.

One method of producing bike-share bicycles is by modifying existing commercial pedal-driven bicycles. The Africabike 3®, available from Kona, is one example of a suitable bicycle that may be modified for use in the bike share system. Specific modifications to commercial bicycles may include modifying the bicycle frame so that any wiring running between the electronic console, power source, and locking mechanism is housed inside the frame of the bicycle; including a sturdy basket on the frame of the bicycle for transporting items; and attaching a leashing mechanism to the seat post of the bicycle so that the seat cannot be easily removed. An alternative means of producing bike-share bicycles is by creating a custom bicycle.

FIG. 1 shows a perspective view of an embodiment of the system with two secured bicycles. It shows an embodiment including two bike-share bicycles 101 locked onto an open-frame bicycle rack 102. The open-frame bicycle rack 102 described within refers to a bicycle rack that is designed to lock only bike-share bicycles. While the rack may be embodied in various shapes, one embodiment of the bicycle rack contains opposed upstanding arms 103 that form an open front slot. The open front slot, which contains no closed loops, prevents bicycles that are not bike-share bicycles from being locked onto the open-frame bicycle rack 102. This design helps prevent private bicycles from being effectively locked to the rack because common bicycle locks cannot be used to lock bicycles onto the open-frame bicycle rack 102 as the lock could be slid past the upstanding arm 103. The open-frame bicycle rack 102 also includes a complementing half-component 105 of the locking mechanisms used to secure bike-share bicycles to the rack, which allows the locking mechanism (not clearly shown) on the bike-share bicycle to be locked on the open-frame bicycle rack 102.

Figure 2:
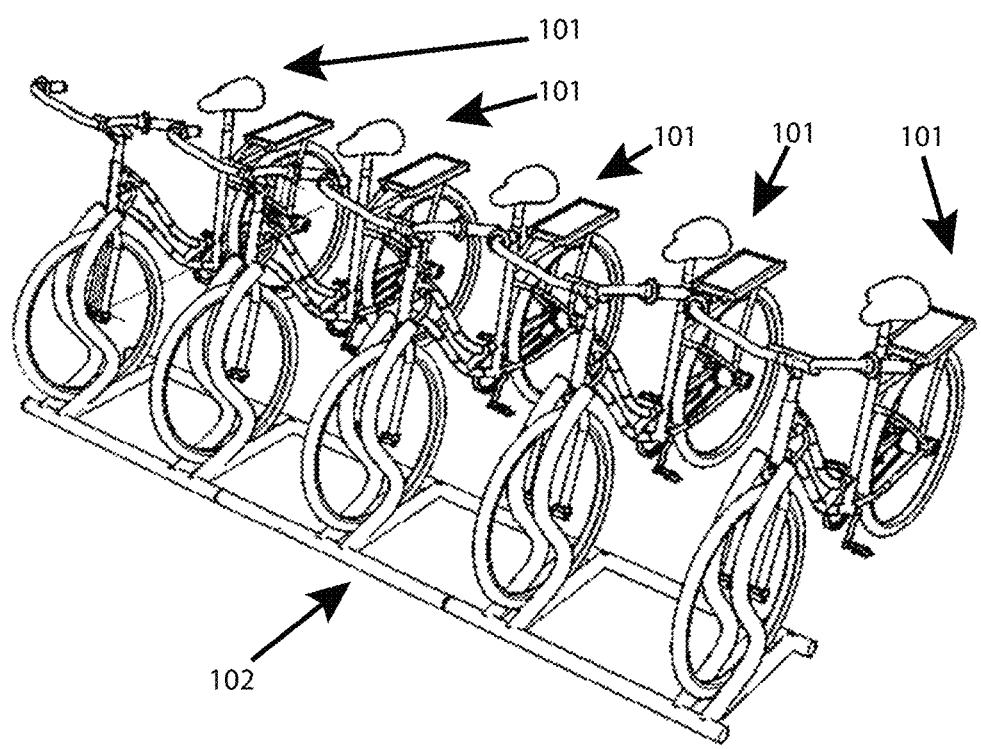
FIG. 2 shows a perspective view of an embodiment of the system with more than two secured bicycles.

FIG. 2 shows a perspective view of an embodiment of the system with more than two secured bicycles. In this embodiment, the open-frame bicycle rack 102 consists of multiple upstanding arms defining multiple open front slots sized to receive a bike-share bicycle wheel rim and tire. The opposing upstanding arms park the bicycles 101 vertically. The open-frame bicycle rack 102 can be made of aluminum, or any other sturdy and durable material.

In another embodiment, the open-frame bicycle rack consists of modular locking units. Each modular locking unit consists of one pair of opposed upstanding arms defining an open front slot sized to receive a bicycle wheel rim and tire. The opposing upstanding arms park the bicycles vertically. The open-frame bicycle rack can be made of aluminum, or any other suitable material. The modular locking units can be assembled together to form an open-frame bicycle rack of variable length.

Figure 3:
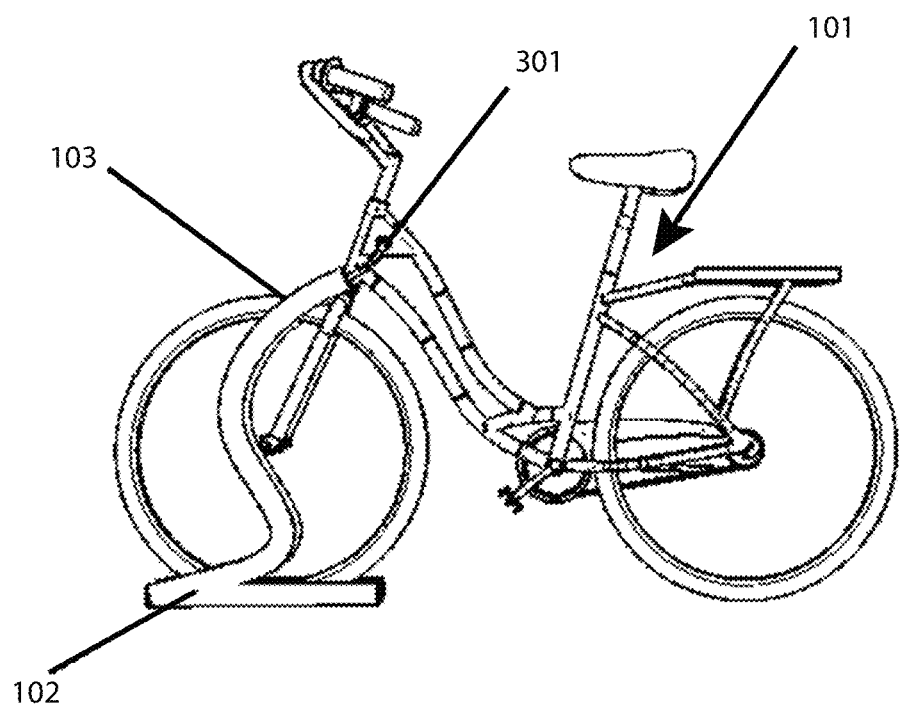
FIG. 3 shows a side view of the system with a secured bicycle.

FIG. 3 shows a side view of the system with a secured bicycle. It shows an embodiment including a single bike-share bicycle 101 that is locked onto the open-frame bicycle rack 102. Locking mechanism 301 refers to the means by which bike-share bicycles are secured to the open-frame bicycle rack. One half-component of the locking mechanism 301 is affixed to the arms of the open-frame bicycle rack 103 while the corresponding half of the locking mechanism is attached to the bike-share bicycles 101.

Figure 4:
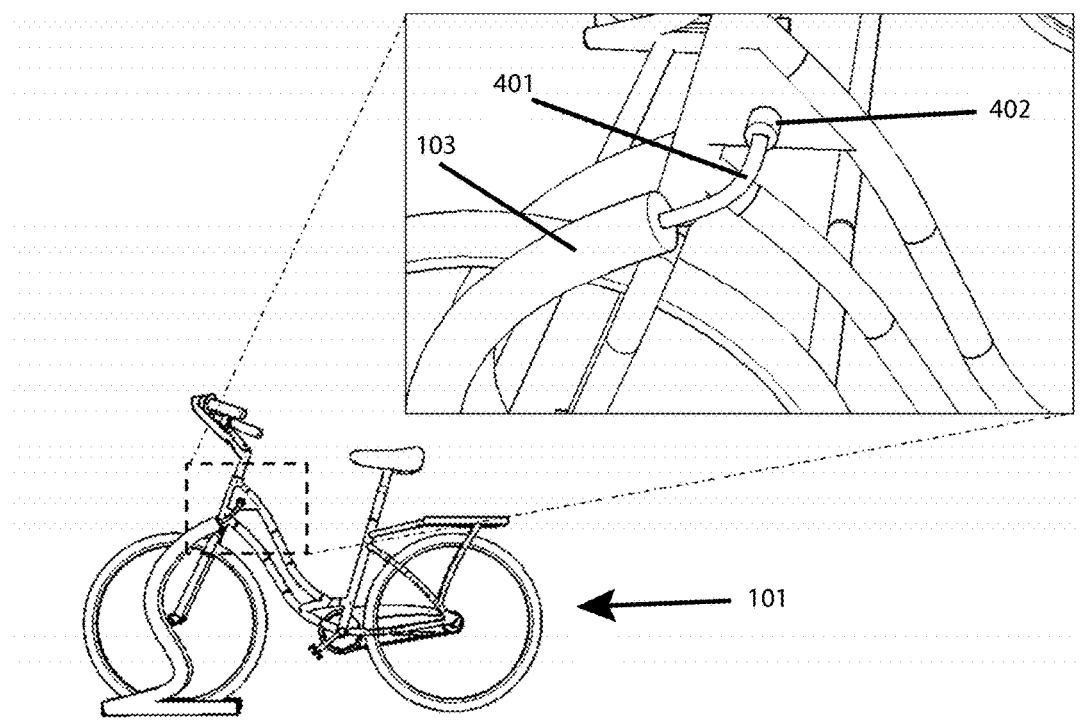
FIG. 4 shows a magnified view of the secured portion of the system with a secured bicycle.

FIG. 4 shows a magnified view of the secured portion of the system with a secured bicycle. In this embodiment of the locking mechanism, the male half component 401 of each locking mechanism is attached to the arm 103 of an open-frame bicycle rack 102 and the female half-component 402 is attached to the bike-share bicycle 101. The male half-component 401 does not require a power source, whereas the female half-component 402 requires a power source to send signals indicating lock status to the electronic console and to release the male half-component 401 upon receiving a signal to do so from an electronic console. The lock is released, or unlocked, when the female half-component of the locking mechanism 402 receives a signal from the electronic console that causes the male half-component 401 to be disengaged from the female half-component 402 of the lock.

Figure 5:
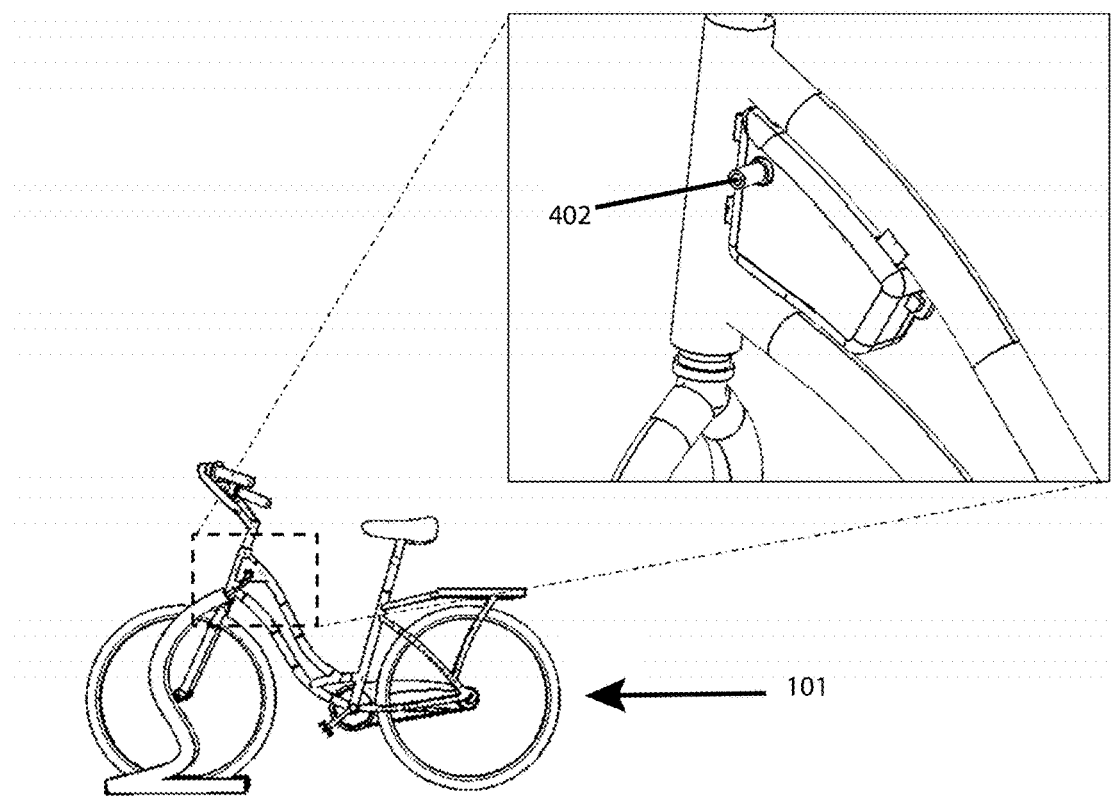
FIG. 5 shows a magnified view of a locking mechanism embodiment on the bicycle.

FIG. 5 shows a magnified view of a locking mechanism embodiment on the bicycle. In FIG. 5, the female half-component 402 is shown without the male half-component 401 of the locking mechanism attached. FIG. 5 also illustrates that the locking mechanism may manifest different outward appearances without affecting the overall function of the locking mechanism.

In another embodiment, the locking mechanism includes a mechanical or electronic sensor in the female half-component of the locking mechanism. When the male half-component of the locking mechanism is engaged with the female half-component, the sensor sends a signal to the electronic console, which allows the electronic console to detect whether the bike-share bicycle is locked onto the open-frame bicycle rack.

The following example is provided to further illustrate one embodiment of the function of the locking mechanism. First, the bicycle-share bicycle is locked to the open-frame bicycle rack, and the female half-component of the locking mechanism is engaged to the male half-component. Next, the user of the bicycle sharing program activates the electronic console, and rents the bicycle through the electronic console. Once the user initiates the rental period of the bike-share bicycle, the electronic console sends an unlock signal to the female half-component of the locking mechanism, which, upon receiving the signal, will release the male half-component of the locking mechanism. After the female half-component of the locking mechanism releases the male half-component of the locking mechanism, the bike-share bicycle is no longer locked to the open-frame bicycle rack, and the user is free to remove the bike-share bicycle from the open-frame bicycle rack.

In the same embodiment of the locking mechanism, when the user returns the bike-share bicycle, the user positions the male half-component of the locking mechanism into the female half-component of the locking mechanism. The female half-component of the locking mechanism automatically engages the male half-component, and locks the bike-share bicycle to the open-frame bicycle rack. A sensor in the bike-share bicycle detects that the lock is engaged and sends a corresponding signal to the electronic console.

Figure 6:
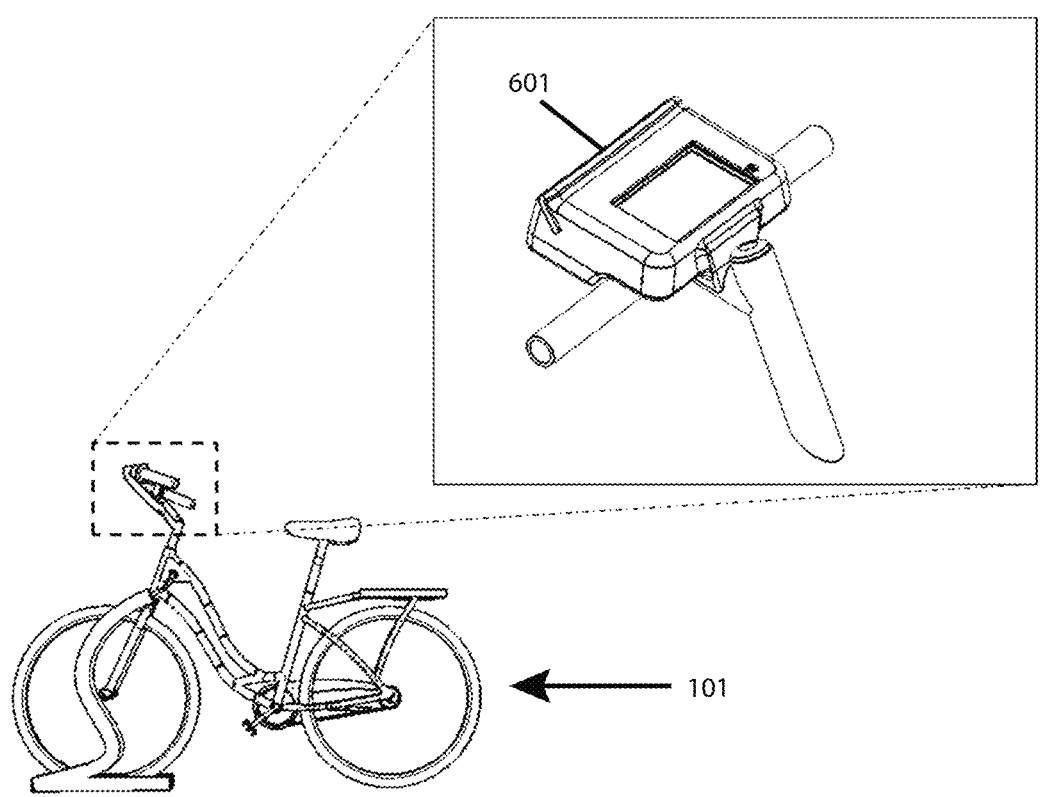
FIG. 6 shows one embodiment of an electronic console.

FIG. 6 shows one embodiment of an electronic console. Electronic console 601 refers to may be a telematic device and computing environment integrated to the bike-share bicycle. The electronic console 601, which can communicate wirelessly with remote servers and databases, also controls the locking mechanism on the bike-share bicycle and enables the bike-share bicycle to be locked or released from the open-frame bicycle rack. The electronic console 601 can be attached to the bicycle using bolts that run through the frame along with welds to the frame or by other fasteners as appropriate. One example of a suitable electronic console is the Samsung Epic 4G® phone. This device may be modified to be powered by a battery which is recharged by means of a power source such as a solar power cell located on the bike-share bicycles, power generated by the mechanical motion of the bicycle, or power routed through the bicycle rack that could be transmitted to the bicycle through the locking cable or alternative means. The electronic console can 601 provide a user interface, connectivity to the database, communication to the locking mechanism, location tracking capabilities, and payment transaction hardware such as a credit card reader.

Additional embodiments of the electronic console include features that will guide the user through the transaction of renting the bike-share bicycle by describing the payment structure and providing a walk-through of the rental process;

provide membership services such as sign-up and viewing membership information; provide location based services such as finding points of interest; provide route finding; find the location of other open-frame bicycle racks; deliver advertisements that depend on the current location of the bicycle; show predefined guided tours; track the duration and distance rode; track the location of the bike-share bicycle; provide help options; show directions to any destination; and contact customer service.

Figure 8:
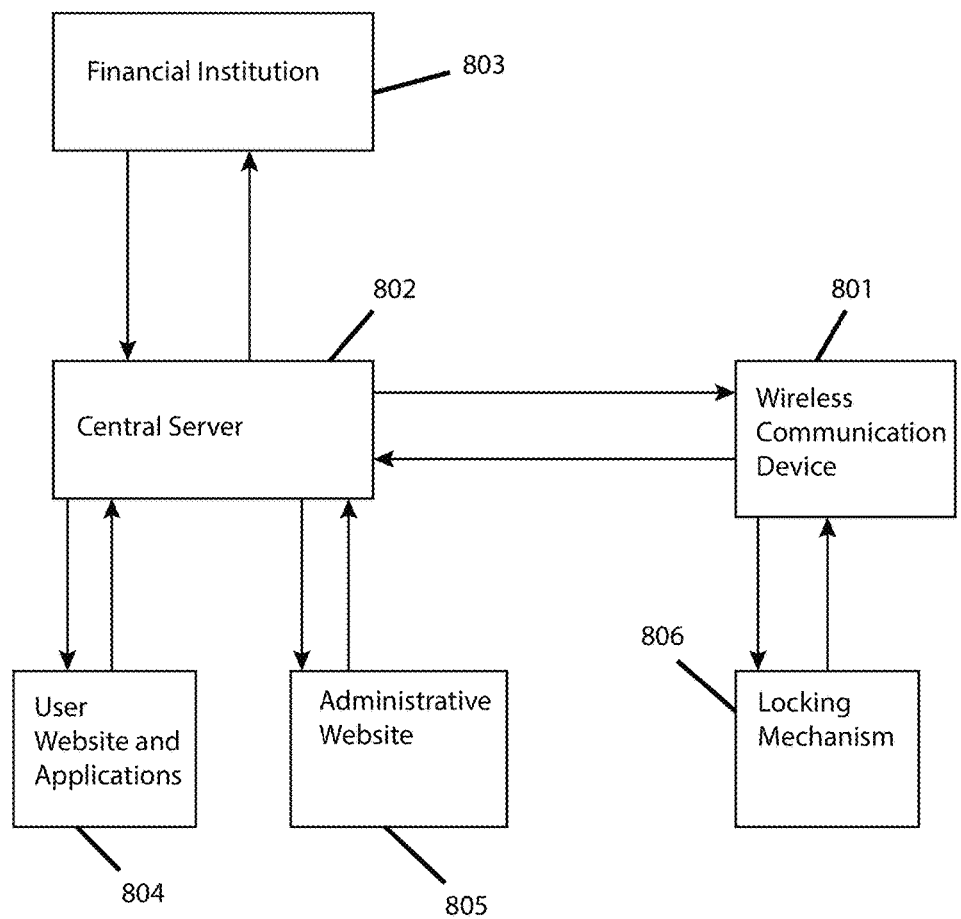
FIG. 8 schematically depicts component elements of an embodiment of a bike-sharing system

FIG. 8 schematically depicts component elements of an embodiment of a bike-sharing system of the present disclosure. Wireless communication device 801 is in communication with central server 802. In an additional embodiment, the electronic console will communicate with a remote server to Wireless communication device 801 may transmit information related to the location of the bicycle, the information entered by the users of the bicycle, maintenance information of the bicycle, and other information related to the individual bicycle. Wireless communication device 801 may also lock or unlock a locking mechanism 806 in response to a signal from central server 802.

In another embodiment, the electronic console will communicate with a remote server which provides a website or application 804. In some embodiments, central server 802 can convey information to the public, preferably through the website and/or an application 804 to be viewed on private mobile devices. The electronic console will may transmit the location where bike-share bicycles can be found, the number available, the location of the closest bike-share bicycle, the transaction history of individual renters, and statistics on rental history. Central server 802 may also communicate with an administrative website 805 through which the similar information may be accessed by system administrators or managers. Central server 802 may also communicate with at least one financial institution 803 to verify payment information entered into wireless communication device 801. This process will be described in more detail in conjunction with FIG. 9. Central server 802 may of course communicate with other entities or servers as appropriate.

Figure 9:
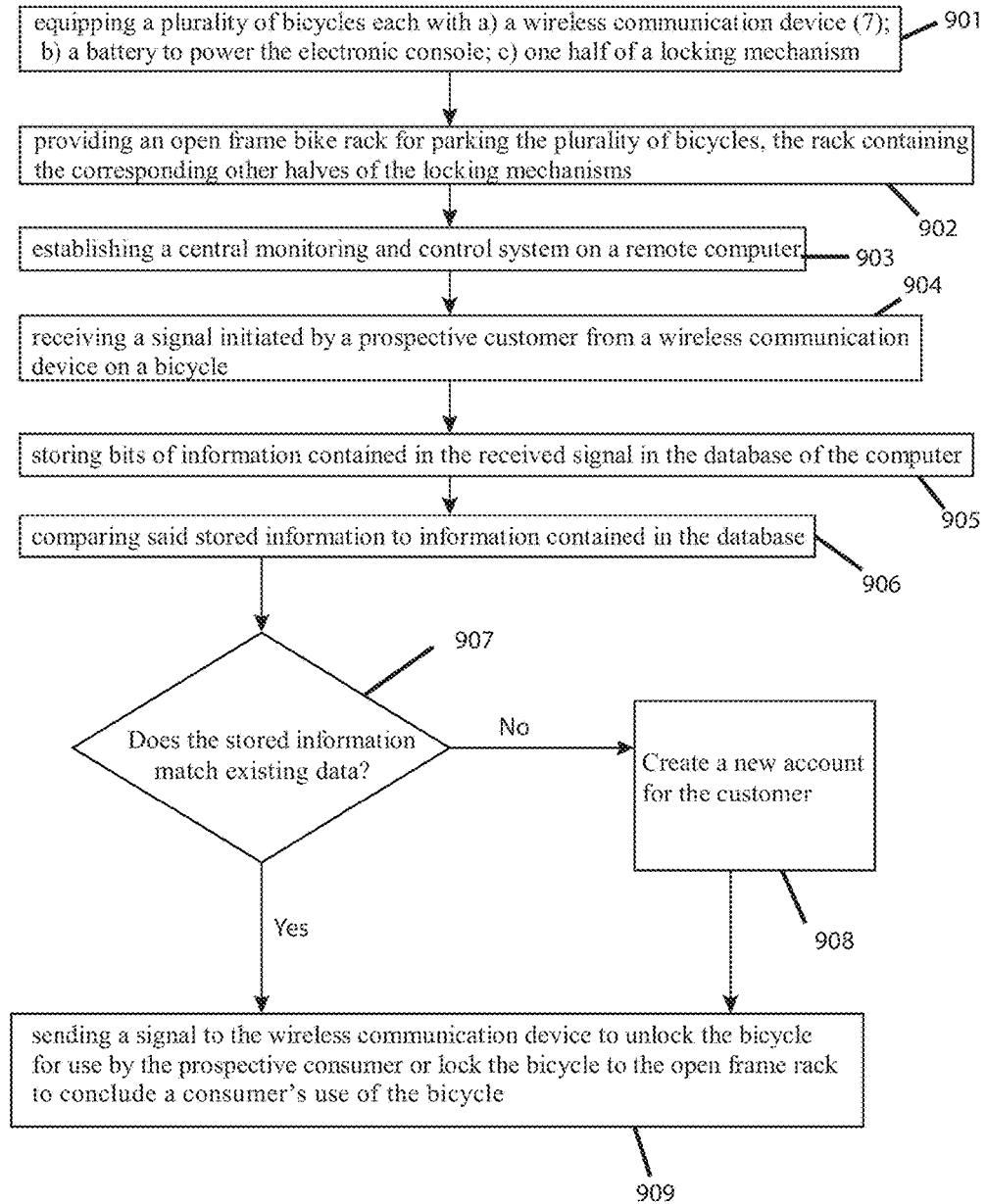
FIG. 9 is a data flow diagram.

FIG. 9 is a data flow diagram. It shows a method for employing a bike-share system. Another aspect of the present disclosure includes a method of conducting a bicycle rental, the method may comprise the steps of 901) equipping a plurality of bicycles each with a) a wireless communication device; b) a battery to power the electronic console; c) one half of a locking mechanism; 902) providing an open frame bike rack for parking the plurality of bicycles, the rack containing the corresponding other halves of the locking mechanisms 903) establishing a central monitoring and control system on a remote computer; 904) receiving a signal initiated by a prospective customer from a wireless communication device on a bicycle; 905) storing bits of information contained in the received signal in the database of the computer; 906) comparing said stored information to information contained in the database; 907) if the stored information does not match existing data, 908 creating a new account for the customer and proceeding to the next step; or if the stored information does match existing data, proceeding to the next step; 909) sending a signal to the wireless communication device to unlock the bicycle for use by the prospective consumer or lock the bicycle to the open frame rack to conclude a consumer's use of the bicycle.

Figure 10:
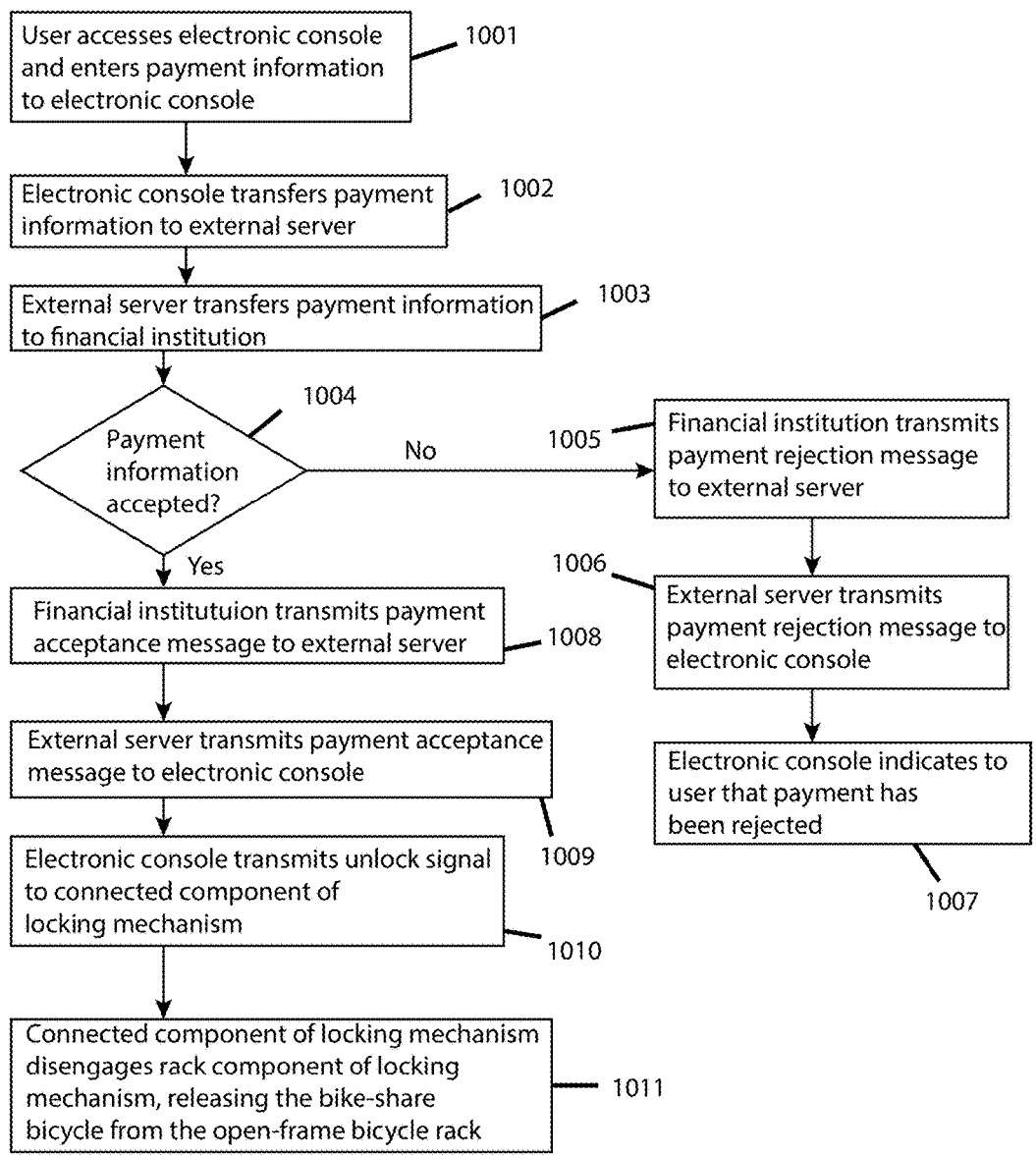
FIG. 10 is a logic flow chart that depicts one embodiment of how a locking mechanism responds to user inputs on the electronic console.

FIG. 10 is a logic flow chart that depicts one embodiment of how a locking mechanism responds to user inputs on the electronic console. It shows a method of operating a bike sharing system according to the present disclosure, and will be described in conjunction with FIG. 9. A user accesses an electronic console and enters payment information 1001. The electronic console may be wireless communication device. The payment information may be entered using methods known in the art, including but not limited to swiping a credit card, typing in credit card information, or logging in using a unique name and password combination associated with a payment method. The console then transmits the payment information to an external server 1002. The external server transmits the electronic payment information to an appropriate financial institution 1003. The financial institution will determine whether to accept or decline the payment information 1004. If the payment information is rejected, then the financial institution will transmit a payment rejection to the external server 1005. The external server will then transmit a payment rejection message to the electronic console 1006. The electronic console will then indicate to the user that payment has been rejected 1007. This may include displaying a visual message or playing an audio cue, or other alerts as appropriate. If instead the payment information is accepted, then the financial institution will transmit a payment acceptance to the external server 1008. The external server will then transmit a payment acceptance message to the electronic console, 1009. The electronic console will then transmit an unlock signal to the component of the locking mechanism that is connected to the console 1010. The component of the locking mechanism that is connected to the console will then mechanically disengage from the component that is connected to the rack, thus releasing the bicycle from the rack 1011.

Figure 11:
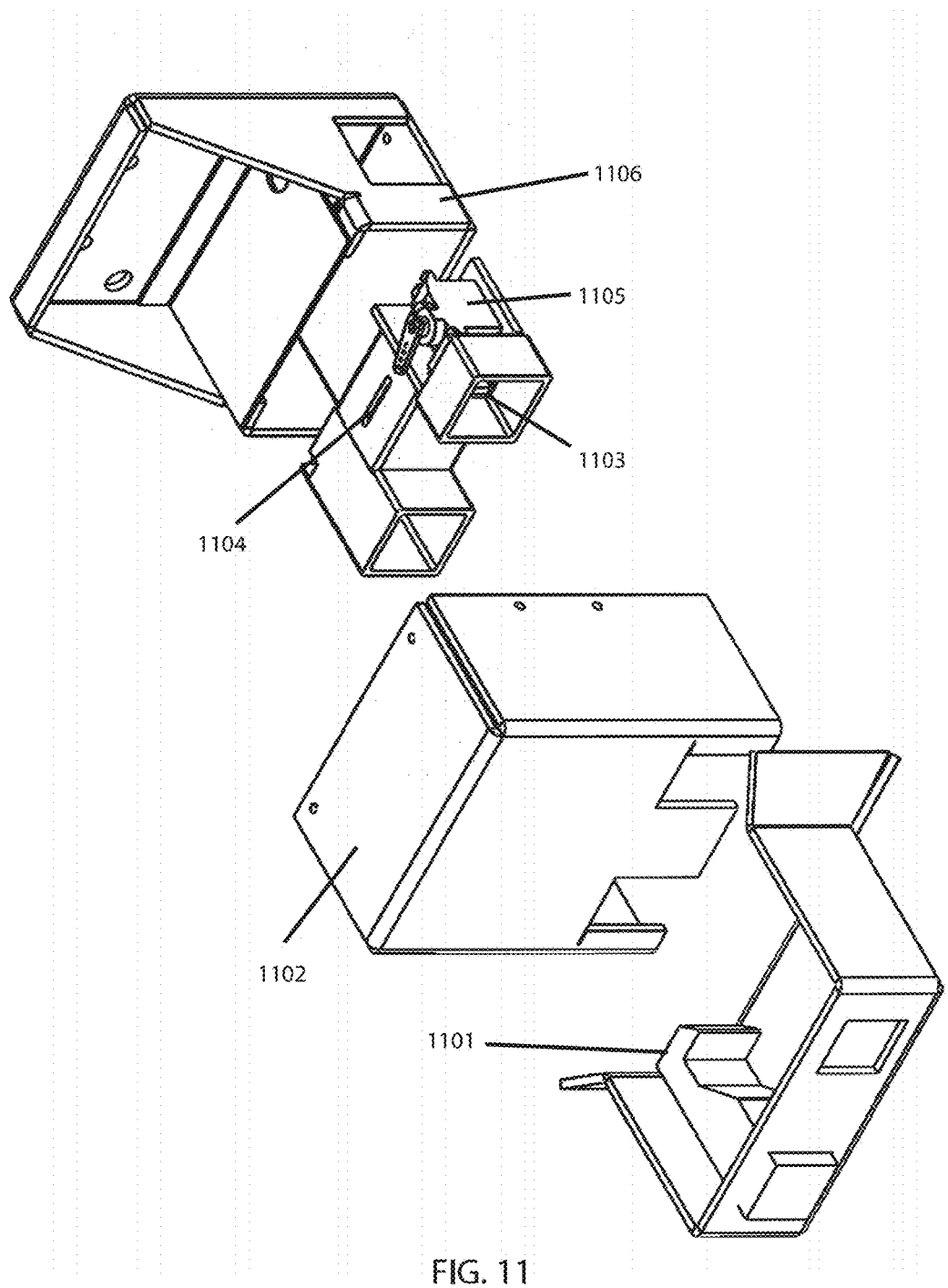
FIG. 11 shows a locking mechanism embodiment.

FIG. 11 shows a locking mechanism embodiment. Shown are a prong 1101, housing cover 1102, spring 1103, pin 1104, servo 1105, and housing 1106.

Figure 12:
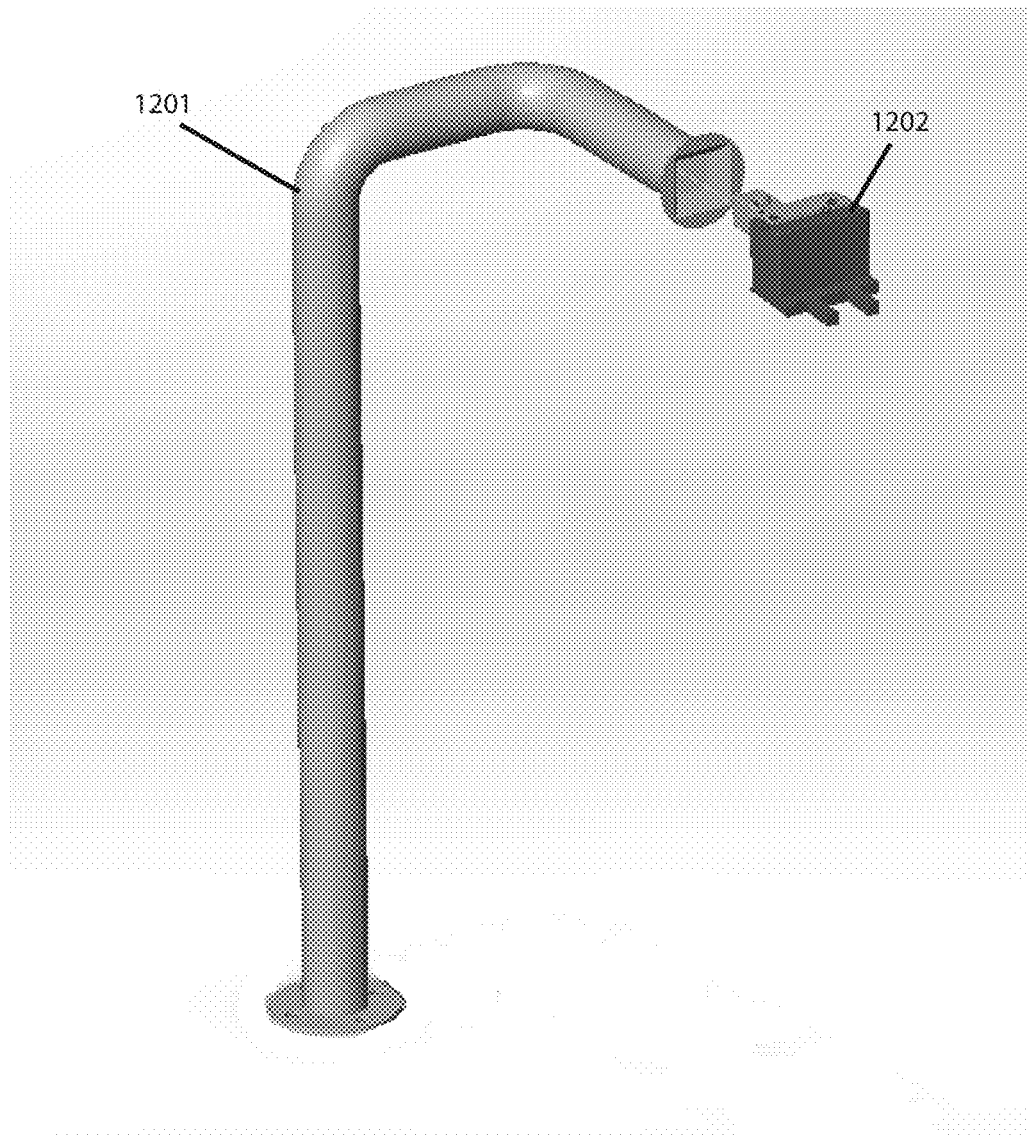
FIG. 12 shows a perspective view of an embodiment of a locking arm with a prong.

FIG. 12 shows a perspective view of an embodiment of a locking arm with a prong. Shown are a locking arm 1201 and a prong 1202.

Figure 7:
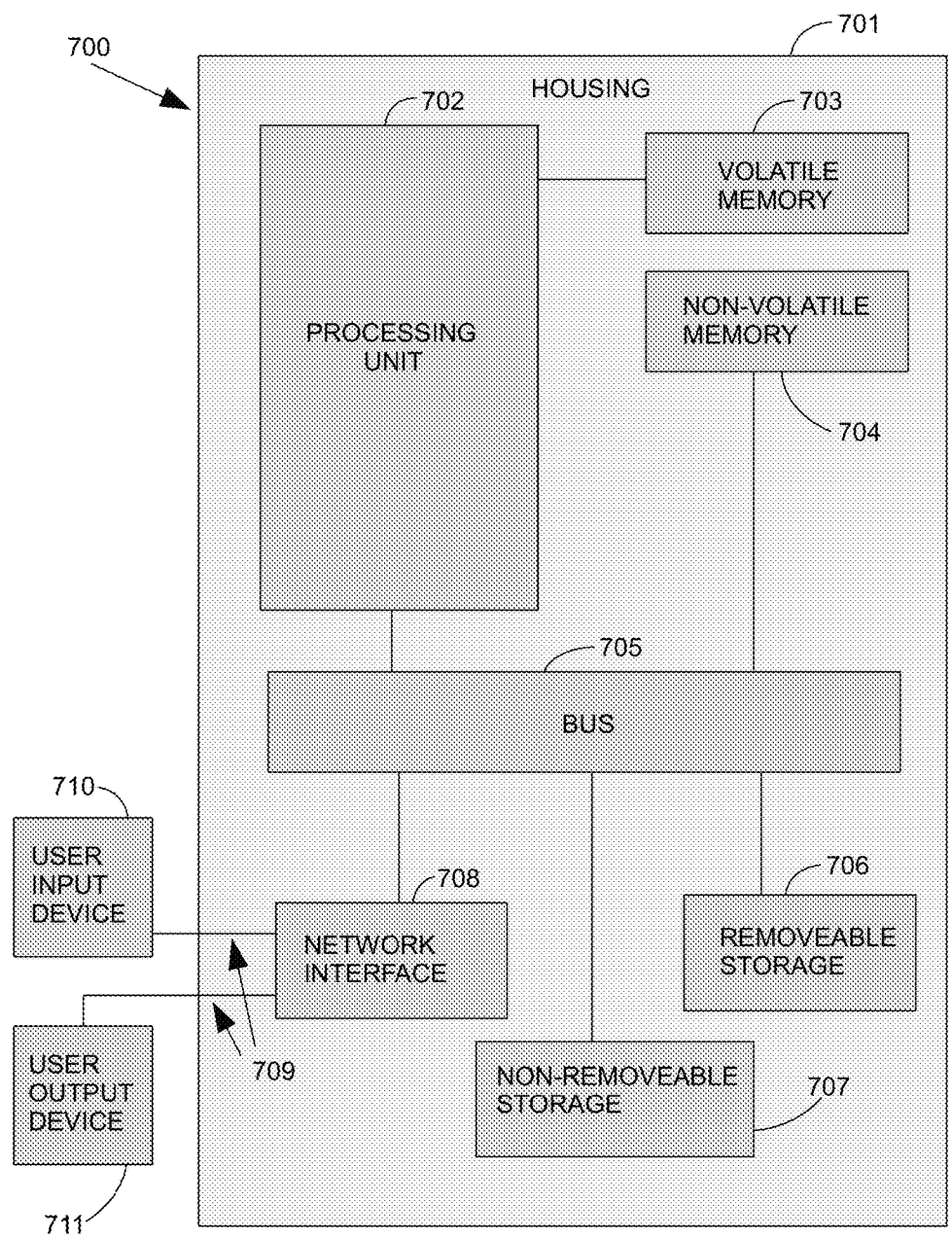
FIG. 7 is a block diagram of a typical computing environment used for implementing embodiments of the present disclosure.

FIG. 7 is a block diagram of a typical computing environment used for implementing embodiments of the present disclosure. FIG. 7 shows a computing environment 700, which can include but is not limited to, a housing 701, processing unit 702, volatile memory 703, non-volatile memory 704, a bus 705, removable storage 706, non-removable storage 707, a network interface 708, ports 709, a user input device 710, and a user output device 711.

Various embodiments of the present subject matter can be implemented in software, which may be run in the environment shown in FIG. 7 or in any other suitable computing environment. The embodiments of the present subject matter are operable in a number of general-purpose or special-purpose computing environments. Some computing environments include personal computers, server computers, hand-held devices (including, but not limited to, telephones and personal digital assistants (PDAs) of all types, iPods, and iPads), laptop devices, tablet devices, multi-processors, microprocessors, set-top boxes, programmable consumer electronics, network computers, minicomputers, mainframe computers, distributed computing environments, and the like to execute code stored on a computer readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

A general computing device, in the form of a computer, may include a processor, memory, removable storage, non-removable storage, bus, and a network interface.

A computer may include or have access to a computing environment that includes one or more user input modules, one or more user output modules, and one or more communication connections such as a network interface card or a USB connection. The one or more output devices can be a display device of a computer, computer monitor, TV screen, plasma display, LCD display, display on a digitizer, display on an electronic tablet, display on a cell phone, display on a smart phone, and the like. The computer may operate in a networked environment using the communication connection to connect one or more remote computers. A remote computer may include a personal computer, server, router, network PC, a peer device or other network node, and/or the like. The communication connection may include a Local Area Network (LAN), a Wide Area Network (WAN), and/or other networks.

Memory may include volatile memory and non-volatile memory. A variety of computer-readable media may be stored in and accessed from the memory elements of a computer, such as volatile memory and non-volatile memory, removable storage and non-removable storage. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, memory sticks, and the like. Memory elements may also include chemical storage, biological storage, and other types of data storage.

"Processor" or "processing unit" as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, an explicitly parallel instruction computing (EPIC) microprocessor, a graphics processor, a digital signal processor, program logic controller (PLC), field programmable gate array (FPGA), or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc. for performing tasks, or defining abstract data types or low-level hardware contexts.

All patents and publications mentioned in the prior art are indicative of the levels of those skilled in the art to which the invention pertains. All patents and publications are herein incorporated by reference to the same extent as if each individual publication was specifically and individually indicated to be incorporated by reference, to the extent that they do not conflict with this disclosure.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations, and broad equivalent arrangements.

We claim:

1. A system for bicycle sharing and rental, the system comprising:
    a rack which comprises a base with one or more locking arm(s), wherein each locking arm has a first end secured to the base and a second end, further wherein the second end has a prong attached; and
    one or more bicycle device(s) which comprises:
        a bicycle;
        a locking mechanism attached to the bicycle; and
        a control device attached to the bicycle, wherein the locking mechanism comprises a controllable female portion that is configured to be able to receive the prong and also receive an electronic signal from the control device that enables the locking mechanism to secure to or release the prong.

2. The system of claim 1, wherein the locking arms do not form closed loops.

3. The system of claim 2, wherein the second end can only be released from the controllable portion of the locking mechanism with an external power source.

4. The system of claim 3, wherein there is more than one locking arm and the locking arms are parallel to each other.

5. The system of claim 3, wherein each arm forms an S-shape.

6. The system of claim 1, wherein the locking arm and prong are fixed and configured to be immovable.

7. A method for bicycle sharing and rental, the method comprising:
    employing a rack which comprises a base with one or more locking arm(s), wherein each locking arm has a first end secured to the base and a second end, further wherein the second end has a prong attached; and
    providing one or more bicycle device(s) which comprises a bicycle, a controllable portion of a locking mechanism that is attached to the bicycle, a locking mechanism attached to the bicycle, and a control device attached to the bicycle, wherein the locking mechanism comprises a controllable female portion that is configured to be able to manually receive the prong and also receive an electronic signal from the control device that enables the locking mechanism to release the prong.

8. The method of claim 7, wherein the rack contains opposed upstanding arms that form an open front slot, which contains no closed loops.

9. The method of claim 8, further wherein the prong can be secured to the controllable portion of the locking mechanism without an electronic signal.

10. The method of claim 9, wherein the second end can only be released from the controllable portion of the locking mechanism with an external power source.

11. The method of claim 7, wherein there is more than one locking arm and the locking arms are parallel to each other.

12. The method of claim 7, wherein each arm forms an S-shape.

13. The method of claim 7, wherein the locking arm(s) and fixture are fixed and configured to be immovable.

* * * * *